US010366126B2

(12) United States Patent
Simske et al.

(10) Patent No.: US 10,366,126 B2
(45) Date of Patent: Jul. 30, 2019

(54) DATA EXTRACTION BASED ON MULTIPLE META-ALGORITHMIC PATTERNS

(71) Applicant: Hewlett-Packard Development Company, L.P., Fort Collins, CO (US)

(72) Inventors: Steven J Simske, Fort Collins, CO (US); A. Marie Vans, Ft. Collins, CO (US); Malgorzata M Sturgill, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 247 days.

(21) Appl. No.: 15/313,062

(22) PCT Filed: May 28, 2014

(86) PCT No.: PCT/US2014/039660
§ 371 (c)(1),
(2) Date: Nov. 21, 2016

(87) PCT Pub. No.: WO2015/183246
PCT Pub. Date: Dec. 3, 2015

(65) Prior Publication Data
US 2017/0147570 A1 May 25, 2017

(51) Int. Cl.
G06F 17/30 (2006.01)
G06F 16/93 (2019.01)
(Continued)

(52) U.S. Cl.
CPC ............ *G06F 16/93* (2019.01); *G06F 16/14* (2019.01); *G06F 16/24535* (2019.01); *G06F 16/345* (2019.01); *G06F 16/90335* (2019.01)

(58) Field of Classification Search
CPC ............ G06F 17/301; G06F 17/30719; G06F 17/30451; G06F 17/30011;
(Continued)

(56) References Cited

U.S. PATENT DOCUMENTS 5,943,669 A * 8/1999 Numata ............ G06F 17/30707
7,181,683 B2 2/2007 Chang
(Continued)

FOREIGN PATENT DOCUMENTS

WO WO-2014-058433 A1 4/2014

OTHER PUBLICATIONS

Galgani, F. et al, "Combining Different Summarization Techniques for Legal Text", Apr. 23, 2012.
(Continued)

*Primary Examiner* — Shiow-Jy Fan
(74) *Attorney, Agent, or Firm* — HP Inc. Patent Department

(57) ABSTRACT

One example is a system including a plurality of combinations of summarization engines and/or meta-algorithmic patterns used to combine a plurality of summarizers, an extractor, an evaluator, and a selector. Each of the plurality of combinations of summarization engines and/or meta-algorithmic patterns receives content to provide a meta-summary of the content. The extractor generates a collection of search queries based on the content. The evaluator determines a similarity value of each combination of summarization engines and/or meta-algorithmic patterns for the collection of search queries. The selector selects an optimal combination of summarization engines and/or meta-algorithmic patterns based on the similarity value.

14 Claims, 4 Drawing Sheets

(51) Int. Cl.
*G06F 16/903* (2019.01)
*G06F 16/14* (2019.01)
*G06F 16/2453* (2019.01)
*G06F 16/34* (2019.01)

(58) Field of Classification Search
CPC ............... G06F 17/30979; G06F 16/93; G06F 16/90335; G06F 16/345; G06F 16/24535; G06F 16/14
USPC .................. 707/E17.005, E17.044, E17.094, E17.122, 707/600, 638, 648, 736, 748, 749, 750
See application file for complete search history.

(56) References Cited

U.S. PATENT DOCUMENTS

| | | | |
|---|---|---|---|
| 7,292,972 B2 | 11/2007 | Lin et al. | |
| 7,711,737 B2 | 5/2010 | Surendran | |
| 8,176,418 B2 | 5/2012 | McKeown et al. | |
| 8,280,903 B2 * | 10/2012 | Broder | G06F 17/2785 707/748 |
| 2003/0101415 A1 * | 5/2003 | Chang | G06F 17/218 715/231 |
| 2005/0203970 A1 * | 9/2005 | McKeown | G06Q 10/10 |
| 2007/0100812 A1 * | 5/2007 | Simske | G06F 17/30011 |
| 2008/0027926 A1 * | 1/2008 | Diao | G06F 17/30719 |
| 2008/0281810 A1 | 11/2008 | Smyth et al. | |
| 2010/0031142 A1 | 2/2010 | Agatomo | |
| 2010/0332520 A1 * | 12/2010 | Lu | G06F 17/30722 707/769 |
| 2011/0113095 A1 * | 5/2011 | Hatami-Hanza | G06F 17/30734 709/204 |
| 2012/0054184 A1 * | 3/2012 | Masud | G06F 17/30598 707/737 |
| 2012/0060082 A1 * | 3/2012 | Edala | G06F 17/241 715/231 |
| 2012/0240032 A1 | 9/2012 | McKeown et al. | |
| 2013/0246334 A1 | 9/2013 | Ahuja et al. | |
| 2014/0201217 A1 * | 7/2014 | Hatami-Hanza | G06F 17/2785 707/748 |

OTHER PUBLICATIONS

Wan, X et al, "Towards an Iterative Reinforcement Approach for Simultaneous Document . . . ", Jun. 15, 2007.

* cited by examiner

DATA EXTRACTION BASED ON MULTIPLE META-ALGORITHMIC PATTERNS

BACKGROUND

Summarizers are computer-based applications that provide a summary of some type of content, such as text. Meta-algorithms are computer-based applications that may be applied to combine two or more summarizers to yield meta-summaries. Meta-summaries may be used in a variety of applications, including data mining applications.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1:
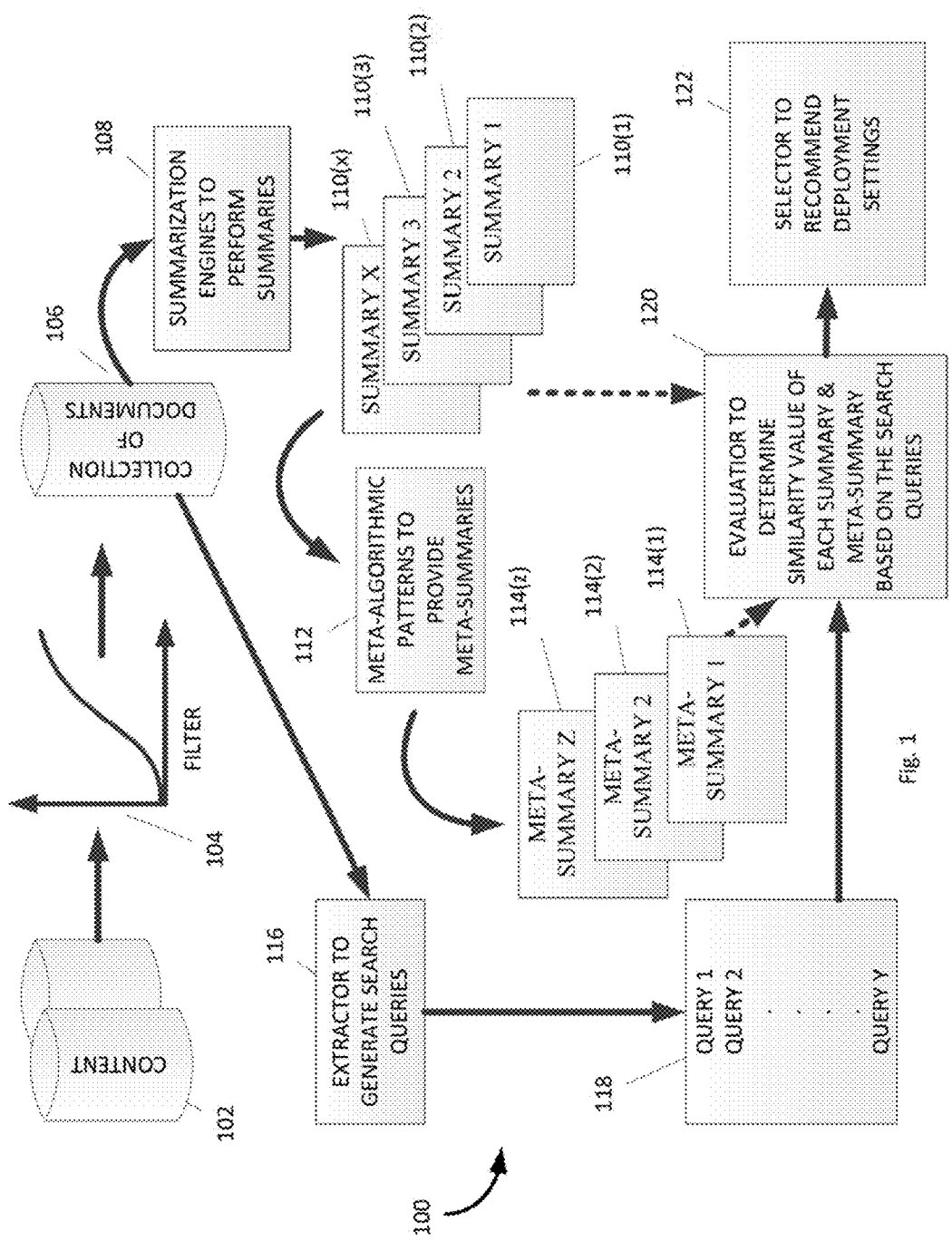
FIG. 1 is a functional block diagram illustrating one example of a system for data extraction based on multiple meta-algorithmic patterns.

FIG. 1 is a functional block diagram illustrating one example of a system 100 for data extraction based on multiple meta-algorithmic patterns. The system receives content, such as a collection of documents, and filters the content. The filtered content is then processed by a plurality of different summarization engines to provide a plurality of summaries. The summaries may be further processed by a plurality of different meta-algorithmic patterns, each meta-algorithmic pattern to be applied to at least two summaries, to provide a collection of meta-summaries, where each meta-summary of the collection of meta-summaries is provided using the at least two summaries. The filtered content is also processed to generate a plurality of search queries based on the collection of documents.

Summarization may be used as a decision criterion for text analytics, each with its own specific elements. In addition to applications related to text analytics, functional summarization may be used for evaluative purposes. Similarity of document selection during search may be used to evaluate translators. For example, a useful language translator will result in the same search behavior as in the original language for the same collection of queries. In general, similarity of summarization indicates similarity of the documents, and so differences in the behavior of multiple summarization engines rather than the behavior of one engine or the collective behavior of a set of engines is often significant.

Validation and/or relative assessment of the individual meta-algorithmic approaches is based on the utilization of indices/keywords for search behavior. After the indices/keywords have been extracted, tags on the documents (and their relative order and/or relative weighting) may be utilized for searching on the collection of documents. The optimal overall extraction to represent a large collection of documents is the one that behaves most closely like the original (unadulterated) collection of documents. That is, the best combination of summarization engines and/or meta-algorithmic patterns is the one that results in search behavior least different from the search behavior for the original collection of documents.

A similarity score is determined for each combination of meta-algorithmic patterns and summarization engines, the similarity score being indicative of a difference in search behaviors of the collection of documents and the collection of meta-summaries, the search behaviors responsive to the plurality of search queries. The summarization engine and/or meta-algorithmic pattern that provides a summary and/or meta-summary, respectively, that has a minimum difference in the aforesaid search behavior is then recommended for deployment. In this way, a summarization architecture optimized for a search task is determined. As described herein, the summarization architecture may be a combination of a plurality of summarization engines and/or a plurality of meta-algorithmic patterns.

Meta-summaries are summarizations created by the intelligent combination of two or more standard or primary summaries. The intelligent combination of multiple intelligent algorithms, systems, or engines is termed "meta-algorithmics", and first-order, second-order, and third-order patterns for meta-algorithmics may be defined.

System 100 includes content 102, a filter 104, filtered collection of documents 106, summarization engines 108, summaries 110(1)-110(x), a plurality of meta-algorithmic patterns 112, meta-summaries 114(1)-114(z), extractor 116, a plurality of search queries 118, an evaluator 120, and a selector 122, where "x", "y", and "z" are any suitable numbers of summaries, queries, and meta-summaries, respectively. Content 102 includes text, meta-data, and/or other computer storable data, including images, sound, and/or video. Content 102 may include a book, an article, a document, or other suitable information. Filter 104 filters content 102 to provide a collection of documents 106 suitable for processing by summarization engines 108. In one example, filter 104 may remove common words (e.g., stop words such as "the", "a", "an", "for", and "of") from content 102. Filter 104 may also remove images, sound, video and/or other portions of content 102 to provide filtered content 106. In one example, filter 104 is excluded and content 102 is provided directly to summarization engines 108.

Summarization engines 108 summarize documents in the collection of documents 106 to provide a plurality of summaries 110(1)-110(x). In one example, each of the summarization engines provides a summary including one or more of the following summarization outputs:

(1) a set of key words;
(2) a set of key phrases;
(3) an extractive set of clauses;
(4) an extractive set of sentences;

(5) an extractive set of clustered sentences, paragraphs, and other text chunks; or (6) an abstractive summarization or semantic.

In other examples, a summarization engine may provide a summary including another suitable summarization output. Different statistical language processing (SLP) and natural language processing (NLP) techniques may be used to generate the summaries.

Meta-algorithmic patterns 112 are used to summarize summaries 110(1)-110(x) to provide a plurality of meta-summaries 114(1)-114(z). Each of the meta-algorithmic patterns is applied to two or more summaries to provide a meta-summary. In one example, each of the plurality of meta-algorithmic patterns is based on one or more of the following approaches:

(1) weighted voting;

(2) predictive selection;

(3) tessellation and recombination;

(4) tessellation and recombination with a decisioner;

(5) predictive selection with a secondary engine; or (6) majority voting

In other examples, a meta-algorithmic pattern may be based on another suitable approach.

In the (1) weighted voting approach, the output of multiple summarization engines or meta-algorithmic patterns is combined and relatively weighted based on the relative confidence in each summarization engine or meta-algorithmic pattern, and the relative weighting of the terms, phrases, clauses, sentences, and chunks in each summarization. In one example, the output of data mining engines may be given in ranked order (e.g., a matrix R), and the weighted voting results may be given in a weighted output (W matrix). If the output of the data mining engines are given in weighted order (W matrix), then weighted voting results in a weighted matrix (e.g., a matrix W). Thus, this meta-algorithmic pattern allows the combination of both ranked and weighted outputs from the summarization engines or meta-algorithmic patterns. Data mining is the discovery of patterns in large data sets. Summarization engines may be combined to provide a summary for the data extracted. In some examples, data mining may provide an exhaustive description of the text information. In some examples, data mining may provide a gist of a document content (specific data) or content that distinguishes the document from other documents (differential data). For the data mining task, the summaries and meta-summaries may be evaluated to determine the summarization architecture that provides the data mining results that provide a significant recovery of tagged content (e.g., ground truth to-be-mined data). As described herein, the summarization architecture may then be selected and recommended for deployment.

The (2) predictive selection approach may include looking at the general topic associated with the key terms in a portion of text and applying a specific summarization engine or set of summarization engines based on membership within a class associated with a particular topic or set of topics. In one example, a combination of summarization engines or meta-algorithmic patterns is selected to create an abridged document representation, A, of an original document, D. The document representation A is then used to represent the document. In one example, such a selection of the combination of summarization engines or meta-algorithmic patterns is based on attributes of the document (including document entropy, document author, document language, and document length). In general, different documents will use different combinations of summarization engines or meta-algorithmic patterns, and the overall result may be compared to the best result from any other meta-algorithmic pattern (such as Weighted Voting) for accuracy.

In the (3) tessellation and recombination method, two types of tessellations may be utilized: (a) tessellation by commonality across multiple combinations of summarization engines or meta-algorithmic patterns, and (b) tessellation by commonality with other documents. In the case of (a), the common terms are kept initially and then incrementally more are added based on maximum dispersion (that is, maximum weighted differences between abridged documents). In the case of (b), the common terms are discarded initially and then incrementally more are added, again based on maximum dispersion between abridged documents.

In the (4) tessellation and recombination method with an expert decisioner, the expert decisioner is used to assign additional (presumably optimal) terms (keywords, phrases, etc.) to the tessellated abridged documents described herein. However, rather than adding them based on a generic means (such as maximum difference or "dispersion" as in (3)), here the terms added are guided by the terms that are considered most representative of the documents themselves. For example, assignment of additional terms may be guided by (a) the salient terms of the document class the document belongs to, if this information is available; (b) the overall set of relevant search terms, if these are available, or (c) significant terms when comparing the document to a large set of mixed-class documents.

In the (5) predictive selection with a secondary engine method, as with the predictive selection described herein, the attributes of document (including document entropy, document author, document language, document length, etc.) are used to choose a particular data mining engine to create the abridged document representation, A, of the original document, D. This A is then used to represent the document thereafter. Different documents will use different data mining engines, and the overall result may be compared to the best result from any other meta-algorithmic pattern (such as Weighted Voting, described herein) for accuracy. In this design pattern, if there is no clear "winner" for predictive selection, then a secondary meta-algorithmic pattern (one of (1) weighted voting, (3) tessellation and recombination, or (4) tessellation and recombination with an expert decisioner) is selected. This may be utilized when predictive selection has a low confidence level; for example, in systems with only modest training data (or ground truth set).

In the (6) majority voting method, key terms agreed on by the majority of the summarization engines are selected. Additional terms left over in the majority voting (based on its error rate either overall or within the subclass chosen by the predictive selection pattern, etc.) are added to create the set of terms. This method tends to select more terms than any single summarization engine since it merges two streams of selection, but may also be pruned by selecting only the first few terms from the majority voting. This pattern works well as more summarization engines are added to the system 100, and in particular, when an odd number of engines are integrated.

Extractor 116 generates a plurality of search queries 118 based on the collection of documents 106. The output of the meta-algorithmic patterns are used for identification of keywords, extraction of salient data and tagging of the documents (e.g. for search, indexing and clustering). Collectively, these are termed "data mining". The original collection of documents may be denoted D{N}, a set of N documents. The collection D{N} is utilized as a bag of words to generate a collection of search queries. This may be achieved by utilizing any of the to-be-deployed combination of summarization engines and/or meta-algorithmic patterns to extract the search queries as the key words, extracted data or tags for the collection D{N}. The output of the summarizers are used to tag documents. For a metadata tagging task, the summaries and meta-summaries are evaluated to determine the summarization architecture that provides the metadata tags (e.g., indices, descriptors, semantic tags) that provide a match to training data. Each summarization architecture is evaluated for its relative value in the search task. The relative value in the search task, (i.e., the relevance or utility for the search task), may be evaluated based on training data, feedback received from users, and/or other suitable criteria applicable to the search task.

The plurality of search queries is called S{M}. A first action of the plurality of search queries S{M} on the collection of documents D{N} is represented as:

$$S\{M\} \rightarrow D\{N\}: \sum_{i=1}^{M}\sum_{j=1}^{N} R_{ij}(D\{N\})$$

Or, alternatively:

$$S\{M\} \rightarrow D\{N\}: \sum_{i=1}^{M}\sum_{j=1}^{N} W_{ij}(D\{N\})$$

where R is an M×N matrix of ranks, and W is an M×N matrix of weights, depending on what the output of the plurality of search queries is. The R-method is the non-parametric method, while the W-method is the parametric method. As indicated, the R-method is based on a ranking of the plurality of search queries, and the W-method is based on a weighting of the plurality of search queries.

The meta-algorithmic patterns of two or more data mining engines are used to create a collection of meta-summaries A{N}. A second action of the plurality of search queries S{M} on the collection of meta-summaries A{N} is represented as:

$$S\{M\} \rightarrow A\{N\}: \sum_{i=1}^{M}\sum_{j=1}^{N} R_{ij}(A\{N\})$$

Or, alternatively:

$$S\{M\} \rightarrow A\{N\}: \sum_{i=1}^{M}\sum_{j=1}^{N} W_{ij}(A\{N\})$$

where R is an M×N matrix of ranks, and W is an M×N matrix of weights, depending on what the output of the plurality of search queries is. As indicated, the R-method is based on a ranking of the plurality of search queries, and the W-method is based on a weighting of the plurality of search queries.

Evaluator 120 determines a similarity score for each combination of meta-algorithmic patterns and summarization engines, the similarity score being indicative of a difference in search behaviors of the collection of documents 106 and the collection of meta-summaries 114(1)-114(z), the search behaviors responsive to the plurality of search queries 118.

In one example, the similarity score is based on a difference between the first action of the plurality of search queries 118 on the collection of documents 106, and the second action of the plurality of search queries 118 on the collection of meta-summaries 114(1)-114(z). If there are L meta-algorithmic patterns, then the similarity score may be based on a difference between a first action of the plurality of search queries on the collection of documents, and a second action of the plurality of search queries on the collection of meta-summaries, as given by:

$$\left(\sum_{i=1}^{M}\sum_{j=1}^{N} R_{ij}(D\{N\}) - \sum_{i=1}^{M}\sum_{j=1}^{N} R_{ij}(A_k\{N\})\right)$$

Or, alternatively:

$$\left(\sum_{i=1}^{M}\sum_{j=1}^{N} W_{ij}(D\{N\}) - \sum_{i=1}^{M}\sum_{j=1}^{N} W_{ij}(A_k\{N\})\right)$$

An optimum pattern is the one satisfying:

$$\min_{k=1\ldots L}\left(\sum_{i=1}^{M}\sum_{j=1}^{N} R_{ij}(D\{N\}) - \sum_{i=1}^{M}\sum_{j=1}^{N} R_{ij}(A_k\{N\})\right)$$

Or, alternatively:

$$\min_{k=1\ldots L}\left(\sum_{i=1}^{M}\sum_{j=1}^{N} W_{ij}(D\{N\}) - \sum_{i=1}^{M}\sum_{j=1}^{N} W_{ij}(A_k\{N\})\right)$$

Selector 122 selects for deployment, via the processing system, a combination of the meta-algorithmic patterns and the summarization engines, where the selection is based on the similarity score. In one example, the selector 122 selects for deployment the combination of the meta-algorithmic patterns and the summarization engines that minimize the similarity score. The recommended deployments settings include the summarization engines and/or meta-algorithmic patterns that provide the optimum summarization architecture with respect to the search behaviors. The optimum summarization architecture may be integrated into a system real-time. The system may be re-configured per preference, schedule, need, or upon the completion of a threshold number of new instances of the tasks.

In one example, the selector 122 generates a meta-summary of a given document of the collection of documents by applying the selected combination of the meta-algorithmic patterns and summarization engines to the given document. In one example, the selector 122 associates, in a database, the generated meta-summary with the given document.

In one example, system 100 is fully automatable. As described herein, the summaries and meta-summaries may be evaluated to determine the summarization architecture that provides a document summary that significantly matches the training data. Generally, the larger the training data and the larger the number of summarization engines available, the better the final system performance. System performance is optimized, however, when the training data is much larger than the number of summarization engines. The summarization architecture is then selected and recommended for deployment.

For example, the number of possible combinations of the meta-algorithmic patterns and the summarization engines is:

$$N_{MP}*(2^{N_{KE}}-1-N_{KE})$$

where, $N_{MP}$ is a number of meta-algorithmic patterns used, and $N_{KE}$ is a number of keyword-generating engines used. A plurality of such combinations may be obtained from one of the six meta-algorithmic patterns described herein: (1) weighted voting; (2) predictive selection; (3) tessellation and recombination; (4) tessellation and recombination with a decisioner; (5) predictive selection with a secondary engine; or (6) majority voting. For example, many different combinations may be used with predictive selection. Accordingly, the system behavior may be given an adaptive summarization architecture over time, allowing it to be very general when first deployed and then narrow the number of feasible combinations over time as a number of documents, classes of documents, and/or search terms increases as the system scales and/or evolves. For example, when the system is first deployed, the following may hold:

$$N_{MP}*(2^{N_{KE}}-1-N_{KE})>N_C$$

or $$N_{MP}*(2^{N_{KE}}-1-N_{KE})>N_{ST}$$

where, $N_C$ is the number of classes of documents and $N_{ST}$ is the number of search terms. This deployment specification may allow many more combinations than the number of classes and/or search terms, which provides design flexibility (e.g., an artificial neural network, genetic algorithm).

As more documents per class and per search term become part of the system, different combinations of the meta-algorithmic patterns and the summarization engines will be de-selected based on their relative lack of effectiveness. As the system evolves, the following may hold:

$$N_{MP}*(2^{N_{KE}}-1-N_{KE}) \ll N_C$$

and $$N_{MP}*(2^{N_{KE}}-1-N_{KE}) \ll N_{ST}$$

Accordingly, the system will have naturally resolved to a smaller set of optimally-combined meta-algorithmic patterns and summarization engines. In one example, as the system is guided by the same combination over a long period (or upon the addition of a substantial amount of documents since the last major system change), meta-algorithmic patterns and summarization engines may be added so that the following may hold:

$$N_{MP}*(2^{N_{KE}}-1-N_{KE}) \approx N_C$$

and $$N_{MP}*(2^{N_{KE}}-1-N_{KE}) \approx N_{ST}$$

This allows some flexibility to changes, in the behavior of the collection of documents, while retaining some memory of the former learned combination of meta-algorithmic patterns and/or summarization engines.

Figure 2:
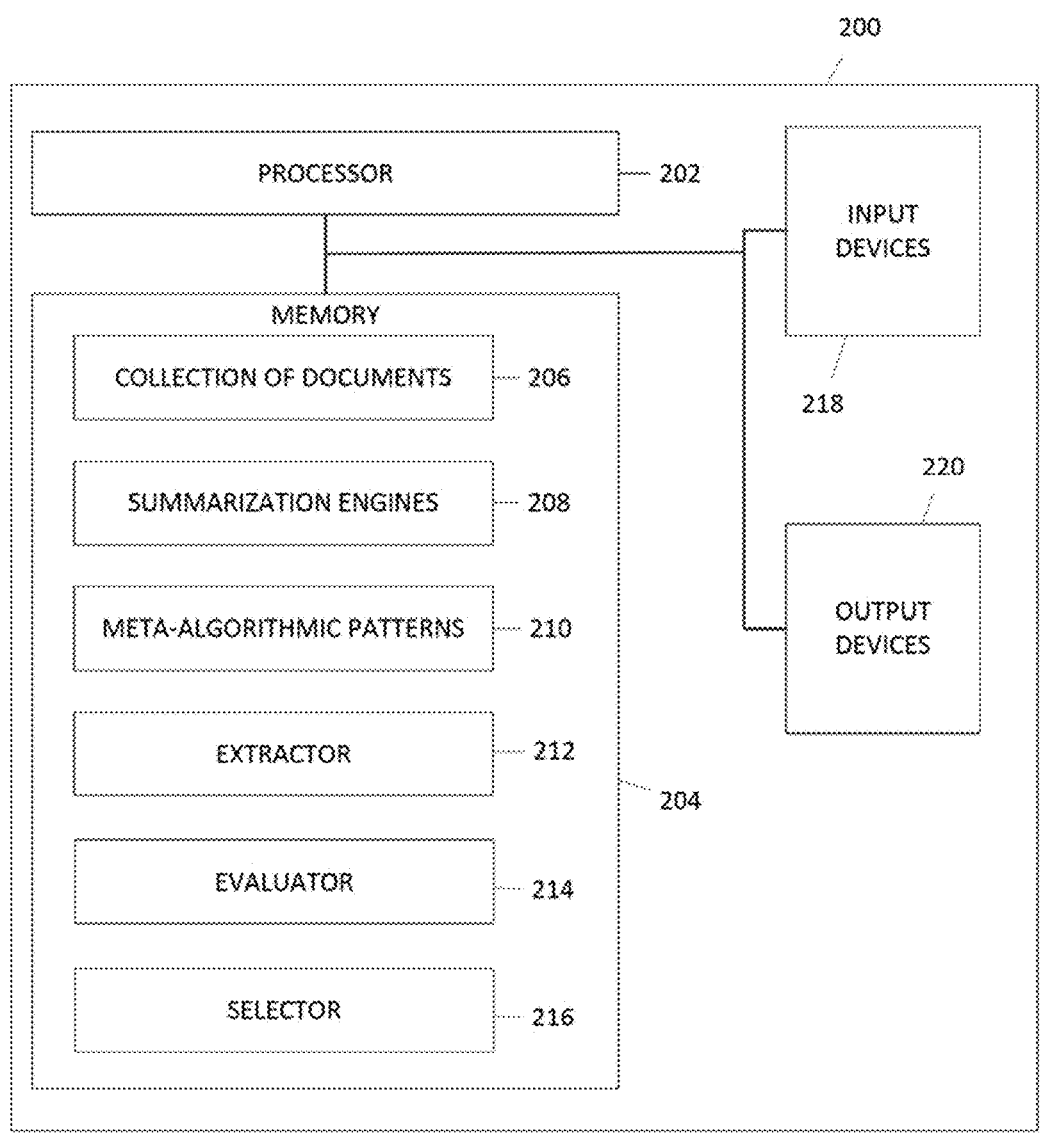
FIG. 2 is a block diagram illustrating one example of a processing system for implementing the system for data extraction based on multiple meta-algorithmic patterns.

FIG. 2 is a block diagram illustrating one example of a processing system 200 for implementing the system 100 for data extraction based on multiple meta-algorithmic patterns. Processing system 200 includes a processor 202, a memory 204, input devices 218, and output devices 220. Processor 202, memory 204, input devices 218, and output devices 220 are coupled to each other through communication link (e.g., a bus).

Processor 202 includes a Central Processing Unit (CPU) or another suitable processor. In one example, memory 204 stores machine readable instructions executed by processor 202 for operating processing system 200. Memory 204 includes any suitable combination of volatile and/or non-volatile memory, such as combinations of Random Access Memory (RAM), Read-Only Memory (ROM), flash memory, and/or other suitable memory.

Memory 204 stores content 206 for processing by processing system 200. Memory 204 also stores instructions to be executed by processor 202 including instructions for summarization engines 208, meta-algorithmic patterns 210, an extractor 212, an evaluator 214, and a selector 216. In one example, summarization engines 208, meta-algorithmic patterns 210, extractor 212, evaluator 214, and selector 216 include summarization engines 108, meta-algorithmic patterns 112, extractor 116, evaluator 120, and selector 122, respectively, as previously described and illustrated with reference to FIG. 1.

In one example, processor 202 executes instructions of filter to filter a collection of documents to provide a filtered collection of documents 206. Processor 202 executes instructions of a plurality of summarization engines 210 to summarize the collection of documents 206 to provide summaries. Processor 202 executes instructions of a plurality of meta-algorithmic patterns 212 to summarize the summaries to provide meta-summaries. Processor 202 executes instructions of extractor 212 to generate a plurality of search queries from the collection of documents 206. Processor 202 executes instructions of evaluator 214 to determine the similarity score for each combination of meta-algorithmic patterns and summarization engines, the similarity score indicative of a difference in search behaviors of the collection of documents and the collection of meta-summaries, the search behaviors responsive to the plurality of search queries. Processor 202 executes instructions of selector 216 to select for deployment a combination of the meta-algorithmic patterns and the summarization engines, the selection based on the similarity score. The selected summarization architecture, i.e. the combination of the meta-algorithmic patterns and the summarization engines, is then recommended for deployment by processing system 200.

Input devices 218 include a keyboard, mouse, data ports, and/or other suitable devices for inputting information into processing system 200. In one example, input devices 218 are used to input feedback from users for evaluating the summaries and meta-summaries for search queries. Output devices 220 include a monitor, speakers, data ports, and/or other suitable devices for outputting information from processing system 200. In one example, output devices 220 are used to output summaries and meta-summaries to users and to recommend the optimum summarization architecture for data extraction.

In one example, the selector 216 generates a meta-summary of a given document of the collection of documents by applying the selected combination of the meta-algorithmic patterns and summarization engines to the given document. In one example, the selector 216 associates, in a database, the generated meta-summary with the given document.

In one example, a search query directed at a document is received via input devices 218. The processor 202 retrieves, from the database, a meta-summary associated with the document; and generates, based on the retrieved meta-summary, search results responsive to the search query. The search results are then provided via output devices 220.

Figure 3:
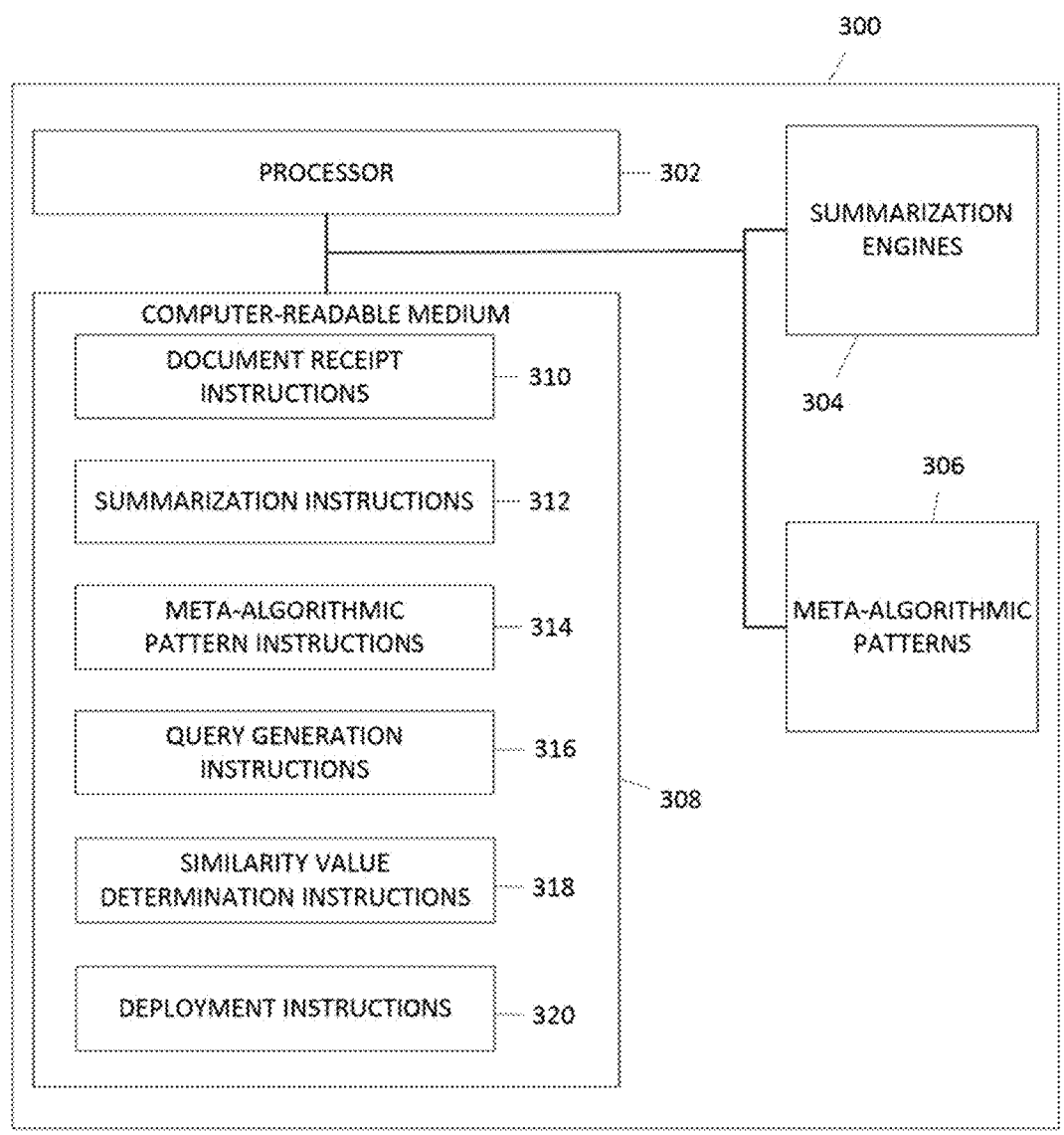
FIG. 3 is a block diagram illustrating one example of a computer readable medium for data extraction based on multiple meta-algorithmic patterns.

FIG. 3 is a block diagram illustrating one example of a computer readable medium for data extraction based on multiple meta-algorithmic patterns. Processing system 300 includes a processor 302, a computer readable medium 308, a plurality of summarization engines 304, and a plurality of meta-algorithmic patterns 306. Processor 302, computer readable medium 308, the plurality of summarization engines 304, and the plurality of meta-algorithmic patterns 306 are coupled to each other through communication link (e.g., a bus).

Processor 302 executes instructions included in the computer readable medium 308. Computer readable medium 308 includes document receipt instructions 310 to receive a collection of documents. Computer readable medium 308 includes summarization instructions 312 of a plurality of summarization engines 304 to summarize the received collection of documents to provide summaries. Computer readable medium 308 includes meta-algorithmic pattern instructions 314 of a plurality of meta-algorithmic patterns 306 to summarize the summaries to provide meta-summaries. Computer readable medium 308 includes query generation instructions 316 of extractor to generate a plurality of search queries from the collection of documents. Computer readable medium 308 includes similarity value determination instructions 318 of evaluator to determine the similarity score for each combination of meta-algorithmic patterns and summarization engines, the similarity score indicative of a difference in search behaviors of the collection of documents and the collection of meta-summaries, where the search behaviors are responsive to the plurality of search queries. Computer readable medium 308 includes deployment instructions 320 of selector to select for deployment a combination of the meta-algorithmic patterns and the summarization engines, the selection based on the similarity score. The selected summarization architecture is then recommended for deployment by processing system 300.

Figure 4:
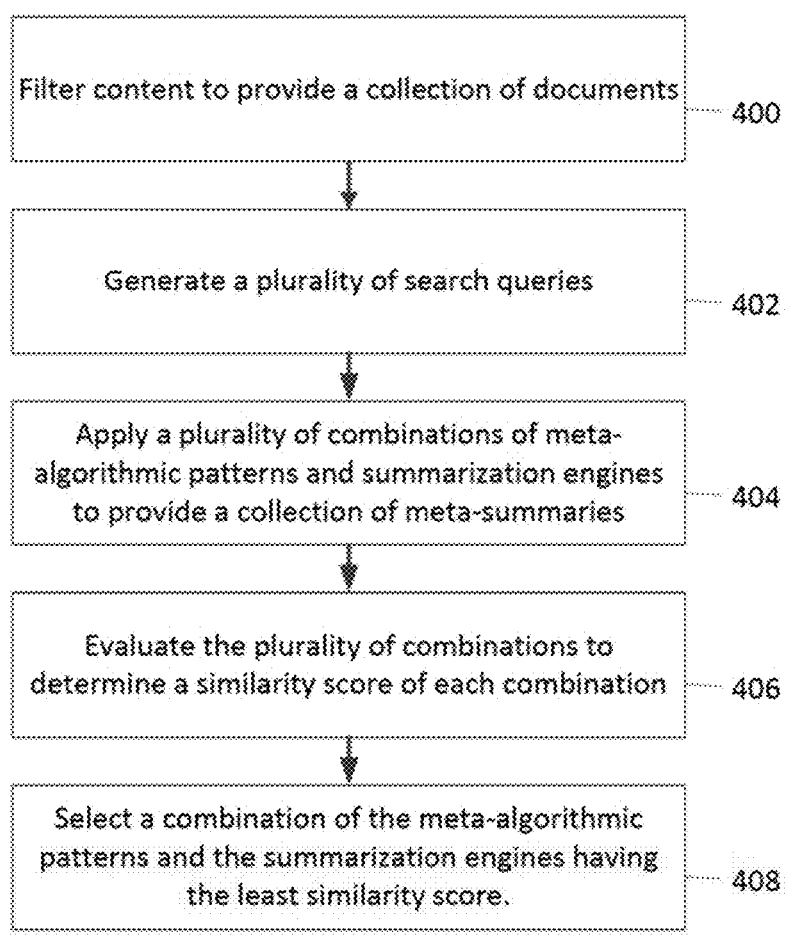
FIG. 4 is a flow diagram illustrating one example of a method for data extraction based on multiple meta-algorithmic patterns.

FIG. 4 is a flow diagram illustrating one example of a method for data extraction based on multiple meta-algorithmic patterns. At 400, content is filtered to provide a collection of documents. At 402, a plurality of search queries are generated. At 404, a plurality of combinations of meta-algorithmic patterns and summarization engines are applied to provide a collection of meta summaries. At 408, the plurality of combinations are evaluated to determine a similarity score of each combination. At 408, a combination of the meta algorithmic patterns and the summarization engines having the least similarity score is selected.

In one example, the method may further include generating a meta-summary of a given document of the collection of documents by applying the selected combination of the meta-algorithmic patterns and summarization engines to the given document, and associating, in a database, the generated meta-summary with the given document.

In one example, the method may further include receiving a search query directed at a document, and retrieving, from the database, a meta-summary associated with the document. The method may further include generating based on the retrieved meta-summary, search results responsive to the search query. In one example, the generated search results may be, provided via output devices.

Examples of the disclosure provide a generalized system for using multiple summaries and meta-algorithms to optimize a text-related intelligence generating or machine intelligence system. The generalized system provides a pattern-based, automatable approach to summarization that may learn and improve over time, and is not fixed on a single technology or machine learning approach. In this way, the content used to represent a larger body of text, suitable to a wide range of applications, may be optimized.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
a processor; and
a non-transitory computer readable medium storing instructions that are executed by the processor, the instructions comprising instructions to:
receive, at each summarization engine of a plurality of summarization engines, a collection of documents to provide a summary of each document of the collection of documents;
provide, via a plurality of meta-algorithmic patterns, each meta-algorithmic pattern to be applied to at least two summaries, a collection of meta-summaries, each meta-summary of the collection of meta-summaries provided using at least two summaries;
to generate a plurality of search queries from the collection of documents;
determine a similarity score for each combination of meta-algorithmic patterns and summarization engines, the similarity score indicative of a difference in search behaviors of the plurality search queries when applied to the collection of documents and the collection of meta-summaries; and
select for deployment in a data mining application, via the processing system, a combination of the meta-algorithmic patterns and the summarization engines, the selection based on a minimum similarity score.

2. The system of claim 1, wherein the instructions are further to generate a meta-summary of a given document of the collection of documents by applying the selected combination of the meta-algorithmic patterns and summarization engines to the given document.

3. The system of claim 1, wherein the evaluation of each combination of meta-algorithmic patterns and summarization engines comprises comparing each combination of meta-algorithmic patterns and summarization engines to training data.

4. The system of claim 1, wherein the similarity score is based on a difference between a first action of the plurality of search queries on the collection of documents, and a second action of the plurality of search queries on the collection of meta-summaries.

5. The system of claim 4, wherein the first action and the second action are based on a ranking of the plurality of search queries.

6. The system of claim 4, wherein the first action and the second action are based on a weighting of the plurality of search queries.

7. The system of claim 1, wherein the plurality of meta-algorithmic patterns are selected from the group comprising weighted voting, predictive selection, tessellation and recombination, tessellation and recombination with a decisioner, predictive selection with a secondary engine, and majority voting.

8. A method to extract data from documents based on meta-algorithm patterns, the method comprising:
    filtering content to provide a collection of documents;
    generating a plurality of search queries from the collection of documents;
    applying a plurality of combinations of meta-algorithmic patterns and summarization engines, wherein:
        each summarization engine provides a summary of each document of the collection of documents,
        each meta-algorithmic pattern is applied to at least two summaries to provide, via a processor, a collection of meta-summaries, each meta-summary of the collection of meta-summaries provided using the at least two summaries;
    evaluating the plurality of combinations to determine a similarity score of each combination, the similarity score based on a difference between a first action of the plurality of search queries on the collection of documents, and a second action of the plurality of search queries on the collection of meta-summaries; and
    selecting a combination of the meta-algorithmic patterns and the summarization engines having a minimum similarity score for a data mining application.

9. The method of claim 8, further comprising:
    generating a meta-summary of a given document of the collection of documents by applying the selected combination of the meta-algorithmic patterns and summarization engines to the given document; and
    associating, in a database, the generated meta-summary with the given document.

10. The method of claim 9, further comprising:
    receiving a search query directed at a document;
    retrieving, from the database, a meta-summary associated with the document; and
    generating, based on the retrieved meta-summary, search results responsive to the search query.

11. The method of claim 8, wherein the plurality of meta-algorithmic patterns are selected from the group comprising weighted voting, predictive selection, tessellation and recombination, tessellation and recombination with a decisioner, predictive selection with a secondary engine, and majority voting.

12. A non-transitory computer readable medium comprising executable instructions to:
    receive a collection of documents via a processor;
    summarize the collection of documents to provide a plurality of summaries via the processor;
    summarize the plurality of summaries using a plurality of meta-algorithmic patterns to provide a collection of meta-summaries via the processor;
    generate a plurality of search queries from the collection of documents;
    determine a similarity score of each combination of a plurality of combinations of meta-algorithmic patterns and summarization engines, the similarity score based on a difference between a first action of the plurality of search queries on the collection of documents, and a second action of the plurality of search queries on the collection of meta-summaries; and
    select for deployment in a data mining application, via the processor, a combination of the meta-algorithmic patterns and the summarization engines having a minimum similarity score.

13. The non-transitory computer readable medium of claim 12, wherein the first action and the second action are based on a ranking of the collection of search queries.

14. The non-transitory computer readable medium of claim 12, wherein the plurality of meta-algorithmic patterns are selected from the group comprising weighted voting, predictive selection, tessellation and recombination, tessellation and recombination with a decisioner, predictive selection with a secondary engine, and majority voting.

* * * * *